May 3, 1955  C. G. CRUZAN  2,707,776
MAGNETRON TYPE SEISMOMETER
Filed March 12, 1951

INVENTOR.
C. G. CRUZAN
BY
Hudson & Young
ATTORNEYS

2,707,776

MAGNETRON TYPE SEISMOMETER

Charles G. Cruzan, Bartlesville, Okla., assignor to Phillips Petroleum Company, a corporation of Delaware Application March 12, 1951, Serial No. 215,145

5 Claims. (Cl. 340—17)

This invention relates to seismometers. In one specific aspect, it relates to a seismometer wherein relative translational or rotational movement of a support relative to an inertia body varies the strength of a magnetic field controlling the flow of electrons through an electron tube.

Heretofore, many types of seismometers have been proposed in which minute ground movements produce relative movement between a support or casing and an inertia body, such relative movement causing a change in a parameter of an electrical system and thereby producing an electrical output representative of the seismic waves incident upon the seismometer. Insofar as I am aware, no one has previously applied the principles of the magnetron type electron tube to transforming the seismic waves into electrical voltages or currents representative thereof.

It is an object of my invention to provide a new and improved type of seismometer.

It is a further object of the invention to provide a practical embodiment of a seismometer utilizing the principles of the magnetron type of electron tube.

It is a further object to provide a seismometer which is sensitive, reliable, and sufficiently rugged as to withstand rough usage in the field.

Various other objects, advantages and features of the invention will become apparent from the following detailed description taken in conjunction with the accompanying drawings, in which.

Figure 1:
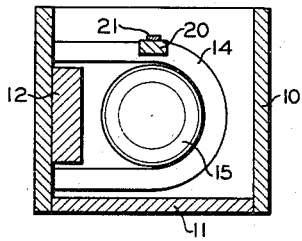
Figure 1 is a vertical sectional view, partially in elevation, of a seismometer constructed in accordance with this invention.
Figure 2:
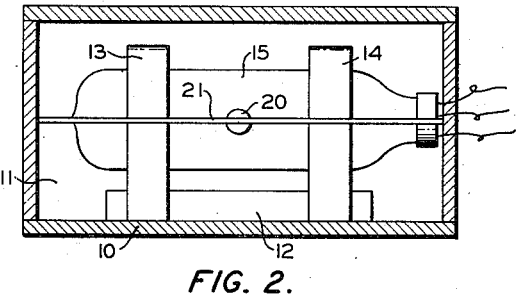
Figure 2 is a top view of the seismometer shown by Figure 1.
Figure 3:
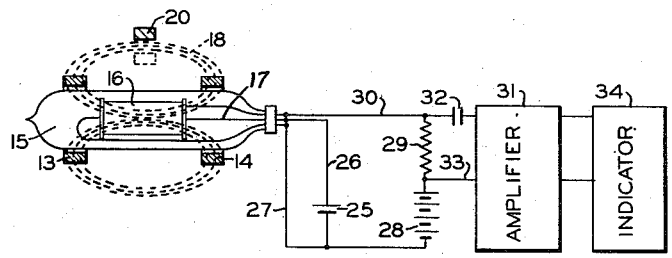
Figure 3 is a diagrammatic view illustrating the principle of operation and a suitable electrical circuit for use wth the seismometer of Figures 1 and 2.

Referring now to the drawings in detail and particularly to Figures 1 and 2, the seismometer comprises a support or casing 10 having a base 11. Secured to the casing 10 is a permanent magnet 12 of the bar type, the respective ends of magnet 12 being embraced by the legs of a pair of horseshoe-shaped flux guides 13 and 14 which are formed from magnetic material. An electron tube 15 is suitably secured within the upper or curved portions of the flux guides 13 and 14. The tube 15 is preferably of the diode type and has a cylindrical anode 16, Figure 3, and an axial cathode 17 which is illustrated as being of the directly heated type although an indirectly heated type cathode may be used, if desired. It will be apparent that the magnet 12 operating in conjunction with flux guides 13 and 14 establishes a magnetic field directed longitudinally between the anode and cathode of the tube 15, as is indicated by the dotted lines 18 of Figure 3.

An inertia body 20, preferably consisting of a cylindrical piece of magnetic material, is secured to the casing 10 by a spring suspension 21, this suspension including a thin flat leaf spring suitably secured at both ends to the casing 10. Seismic waves incident upon the unit cause the casing 10 to be shifted vertically relative to the inertia body 20 with the result that the tube 15 is moved toward or away from the magnetic inertia body 20.

The electrical circuit associated with the tube 15 includes a filament battery 25 and filament voltage supply leads 26 and 27. Lead 27 also constitutes the cathode lead and is connected through a battery 28, a load resistance 29, and a lead 30 to the anode 16. In this manner, operating potentials are supplied to the electrodes of the tube. The input circuit of amplifier 31 is connected across the resistance 29, one input lead being connected through a condenser 32 to lead 30, and the other input lead 33 being connected to the junction between resistance 29 and battery 28. The output of amplifier 31 is fed to an indicating device 34 which indicates the intensity of the seismic waves in the manner hereinafter described. It will be understood that, by the term indicator, I intend to include an indicating meter, a recorder, or any other suitable device for producing an indication representative of the current flow in the anode-cathode circuit of tube 15. If desired the base 11 may be hollow, and of sufficient size as to accommodate the battery 25 .

In the operation of the seismometer, as stated, relative movement between the casing and inertia body produced by seismic waves causes tube 15 to move toward or away from inertia body 20. When inertia body 20 occupies a position remote from the tube, it does not interfere with the magnetic field produced by the flux guides 13, 14 and the magnet 12. As a result, a maximum field exists between the anode and the cathode with the result that the plate current through the tube is a minimum. When the inertia body is positioned close to the tube, as indicated by the dotted lines of Figure 3, the inertia body 20 tends to pull the stray flux which surrounds it so as to pass through it since it provides a path of low reluctance for such flux. Consequently, the intensity of the magnetic field between the anode and the cathode is reduced with the result that the plate current is increased. Thus, the variations in anode current flowing through the tube 15 are representative of the seismic waves incident upon the seismometer. These current variations are amplified by unit 31 and the amplified current is fed to indicator 34.

In the modification of the invention shown by Figure 4, two similar assemblies are provided, one of which is positioned above the inertia body 20 and the other of which is positioned below the inertia body 20. These assemblies include tubes 15a, 15b, flux guides 13a, 13b and 14a, 14b corresponding to the similarly numbered elements of Figures 1 and 2. It will be understood that the flux guides have permanent magnets associated therewith, that the inertia body is suspended from a casing, and that the magnetic assembly is mounted upon the casing in the manner described in connection with Figures 1 and 2. The tubes have anodes 16a, 16b, filaments or cathodes 17a, 17b and output leads 26a, 26b; 27a, 27b; and 30a, 30b corresponding to the similarly numbered elements in Figures 1 and 2. The leads 26a, 26b are both connected to the positive terminal of a filament battery 36, the negative terminal of which is connected to the junction between leads 27a and 27b. Also connected to this junction is the negative terminal of a battery 37, the positive terminal of which is connected to the junction between the resistances 39 and 40 which, in turn, are connected to the respective leads 30a and 30b.

The push-pull amplifier 41 has its input circuits connected through coupling condensers 42, 43 and ground at 44 to lead 30a, lead 30b, and the junction between resistances 39, 40, respectively. The output of push-pull amplifier 41 is fed to an indicating device 45.

Figure 4:
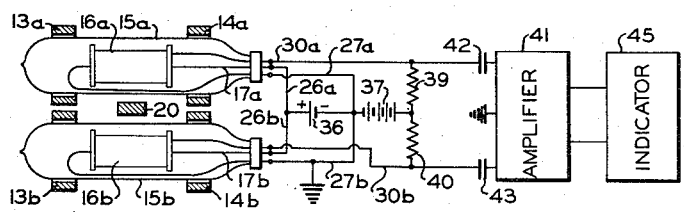
Figure 4 is a diagrammatic view of a modified form of seismometer with a suitable electrical circuit therefor.

In the operation of the circuit of Figure 4, upward movement of the assemblies causes the inertia body 20 to be positioned closer to tube 15b and further away from tube 15a. As a result, the anode current in tube 15b is increased and the anode current in tube 15a is decreased. Downward movement of the assemblies produces an opposite effect. That is, the anode current through tube 15a is increased while the anode current through tube 15b is decreased. These out of phase current variations are reinforced by the action of push-pull amplifier 41 and produce variations at indicator 45 which are representative of the seismic waves incident upon the seismometer.

Figure 5:
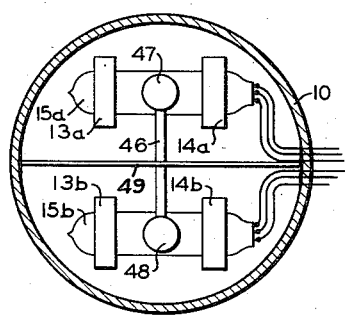
Figure 5 is top view of a further modification of the invention.

In the modification of the invention shown by Figure 5, two assemblies are provided which are similar to those described in connection with Figure 4, the output leads of the tubes being connected to a suitable amplifier circuit of the same type and in the same manner as described in connection with that figure. In the modification, however, the inertia body includes a rod 46 carrying an inertia member 47 of magnetic material which is positioned at one end of the rod adjacent tube 15a and a second inertia member 48 of magnetic material which is positioned at the other end of rod 46 adjacent tube 15b. The central portion of rod 46 is secured to the center of a torsion wire 49 having its ends suitably secured to the casing 10. In the modification shown by this figure, relative translational movement between the casing and inertia body has no effect. However, relative rotational movement between the casing and inertia body produces an electrical output representative thereof. Thus, rotational movement of the casing 10 in a clockwise direction, as viewed from the righthand side of Figure 5, causes tube 15b to move closer to inertia body 48 while tube 15a moves away from inertia body 47. As a result, the plate current in tube 15b is increased while the plate current through tube 15a is decreased. Rotation of the casing relative to the inertia body in the opposite direction produces an opposite effect resulting in an increase in the plate current of tube 15a and a decrease in the plate current of tube 15b. As a result, the currents amplified and combined in push-pull amplifier 41 and indicated by unit 45 are representative of the rotational waves incident upon the seismometer.

Figure 6:
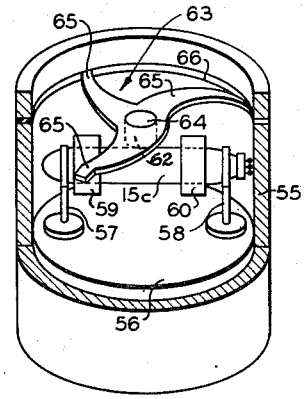
Figure 6 is a perspective view of a further modification of the invention.

In the modification of the invention shown by Figure 6, a cylindrical casing 55 is provided which incorporates a hollow base 56 suitable for housing the filament battery of the tube. A tube 15c is supported in a horizontal position by suitable brackets 57 and 58. Encircling the tube 15c and positioned adjacent the ends thereof are a pair of annular permanent magnets 59 and 60 so arranged that the inner facing surfaces thereof are of opposite polarity. The tube 15c is connected in a circuit similar to that shown by Figure 3.

An inertia body 62 of magnetic material is suspended from the casing by a flat leaf spring 63 which includes a central portion 64 supporting the inertia body together with three curved arms 65 which extend radially outward toward and are secured to the casing 55, the outer ends of the arms fitting within slot 66 in the casing. The permanent magnet produces a field similar to that shown in Figure 3, and seismic waves incident upon the unit cause the casing to be shifted vertically relative to the inertia body 62, thereby producing a current representative of the seismic waves in the manner described in connection with Figures 1 and 2.

While the invention has been described in connection with a present, perferred embodiment thereof, it is to be understood that this description is illustrative only and is not intended to limit the invention, the scope of which is defined by the appended claims.

I claim:

1. A seismometer comprising, in combination, a support adapted to be moved by seismic waves, an inertia body including a member of magnetic material, an electron tube rigidly secured to said support, said tube having an elongated axial anode and cathode, means for supplying operating potentials to the electrodes of said tube, means for establishing a magnetic field between said anode and said cathode, and a spring suspension connecting said support and said inertia body and arranged to produce relative movement between said member of magnetic material and said support along a line perpendicular to the axis of said anode and cathode in response to seismic waves incident on said support, thereby to vary said magnetic field and the current in the anode-cathode circuit of said tube.

2. A seismometer in accordance with claim 1 in which the spring suspension is a leaf spring having both ends thereof secured to the support and disposed parallel to said axis, the inertia body being a disk of magnetic material secured to said leaf spring.

3. A seismometer in accordance with claim 1 in which a second tube having an elongated axial anode and cathode is rigidly secured to the support, and the relative movement between said member of magnetic material and said support is along a line perpendicular to the axis of the anode and cathode of both tubes.

4. A seismometer in accordance with claim 1 wherein the spring suspension is a torsion wire having both ends secured to said support, and wherein the relative movement between the magnetic member and support is angular relative movement.

5. A seismometer comprising, in combination, a support adapted to be moved by seismic waves, an inertia body including a member of magnetic material, an electrode tube rigidly secured to said support, said tube having an axially-extending cathode positioned within a generally cylindrical anode, means for supplying operating potentials to the electrodes of said tube, means for establishing a longitudinally-oriented field between said anode and said cathode, and a spring suspension connecting said support and said inertia body and arranged to produce relative movement between said member of magnetic material and said support along a line perpendicular to the axis of said anode and cathode in response to seismic waves incident on said support, thereby to vary said magnetic field and the current in the anode-cathode circuit of said tube.

References Cited in the file of this patent

UNITED STATES PATENTS

| Number | Name | Date |
|---|---|---|
| 1,673,681 | Hull et al. | June 12, 1928 |
| 1,784,415 | Benioff | Dec. 9, 1930 |
| 1,864,214 | Petty | June 21, 1932 |
| 2,219,745 | Linder | Oct. 29, 1940 |
| 2,338,732 | Nosker | Jan. 11, 1944 |
| 2,372,056 | Broding | Mar. 20, 1945 |
| 2,390,187 | Sharpe | Dec. 4, 1945 |
| 2,476,611 | Linder | July 19, 1949 |
| 2,487,029 | Piety | Nov. 1, 1949 |
| 2,587,481 | Kaehni et al. | Feb. 26, 1952 |

FOREIGN PATENTS

| 798,715 | France | Mar. 11, 1936 |